H. CHRISTIANSON.
SHOCK CARRIER.
APPLICATION FILED FEB. 6, 1909.
927,114.
Patented July 6, 1909.
4 SHEETS—SHEET 3.
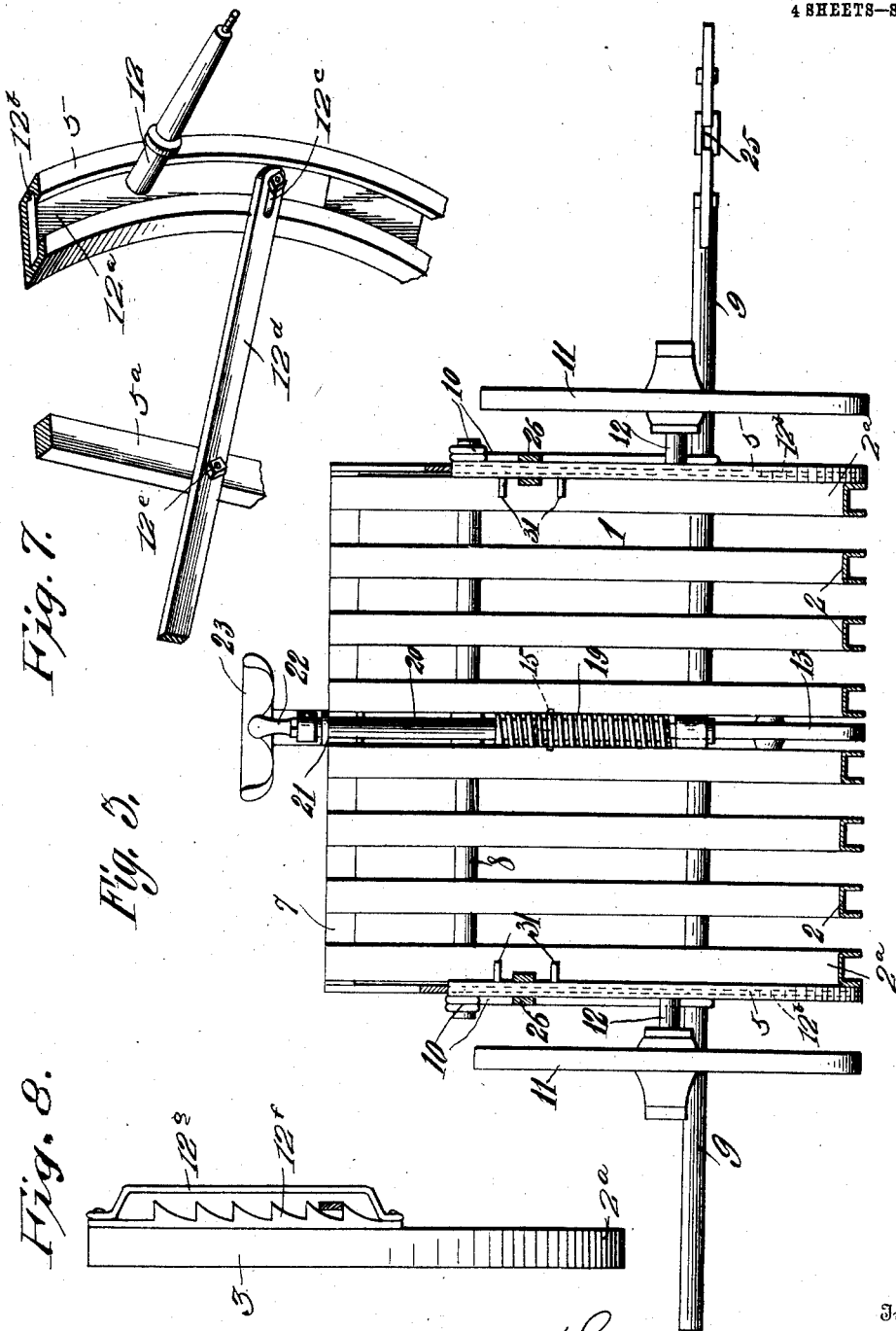
Witnesses
Morris Lewin
E. M. Ricketts
Inventor
Halfdan Christianson
By Watson E. Coleman
Attorney H. CHRISTIANSON.
SHOCK CARRIER.
APPLICATION FILED FEB. 6, 1909.
927,114.
Patented July 6, 1909.
4 SHEETS—SHEET 4.
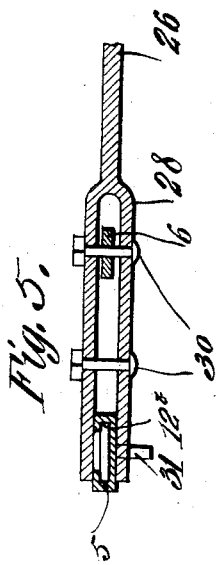
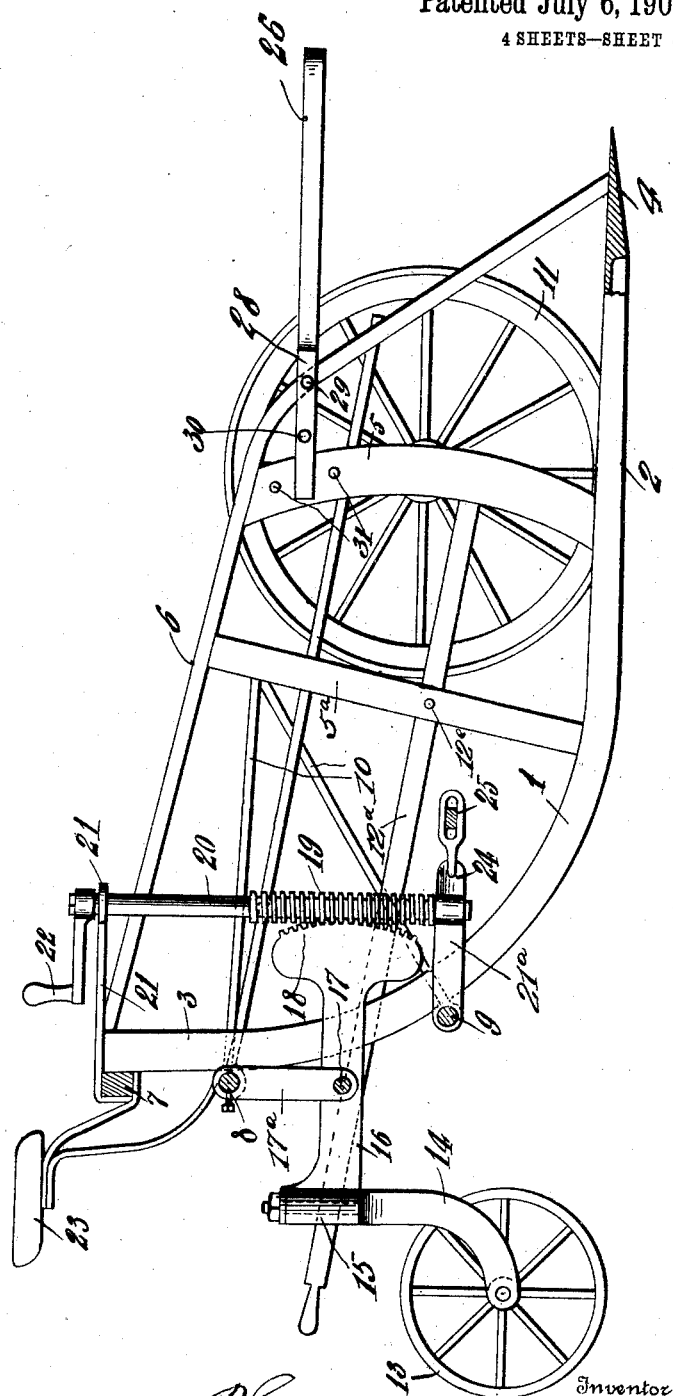
Witnesses
Morris Lessig
E. M. Ricketts
Inventor
Halfdan Christianson
By Watson E. Coleman
Attorney

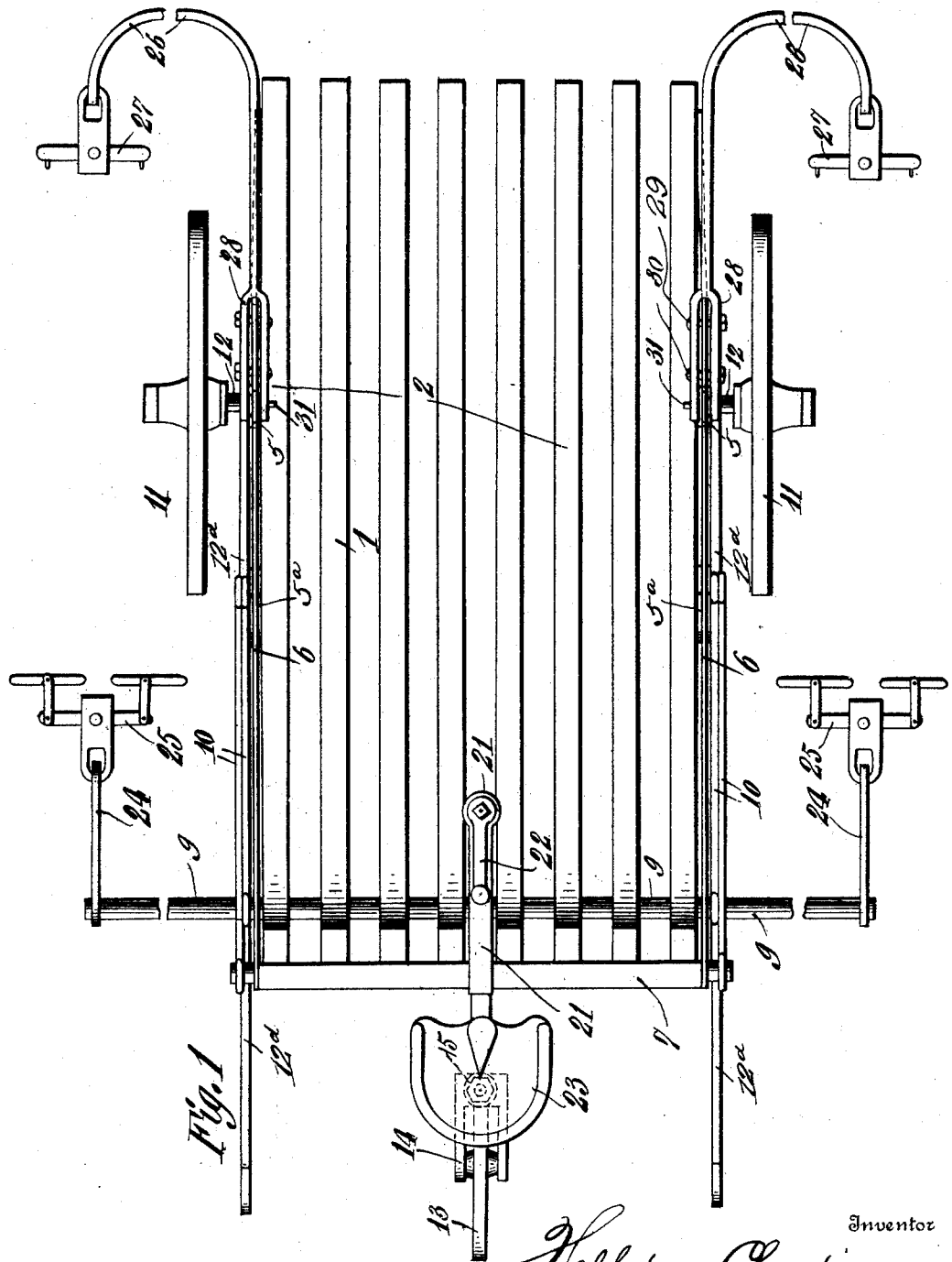

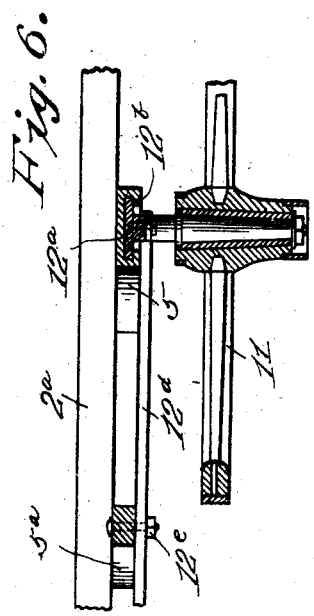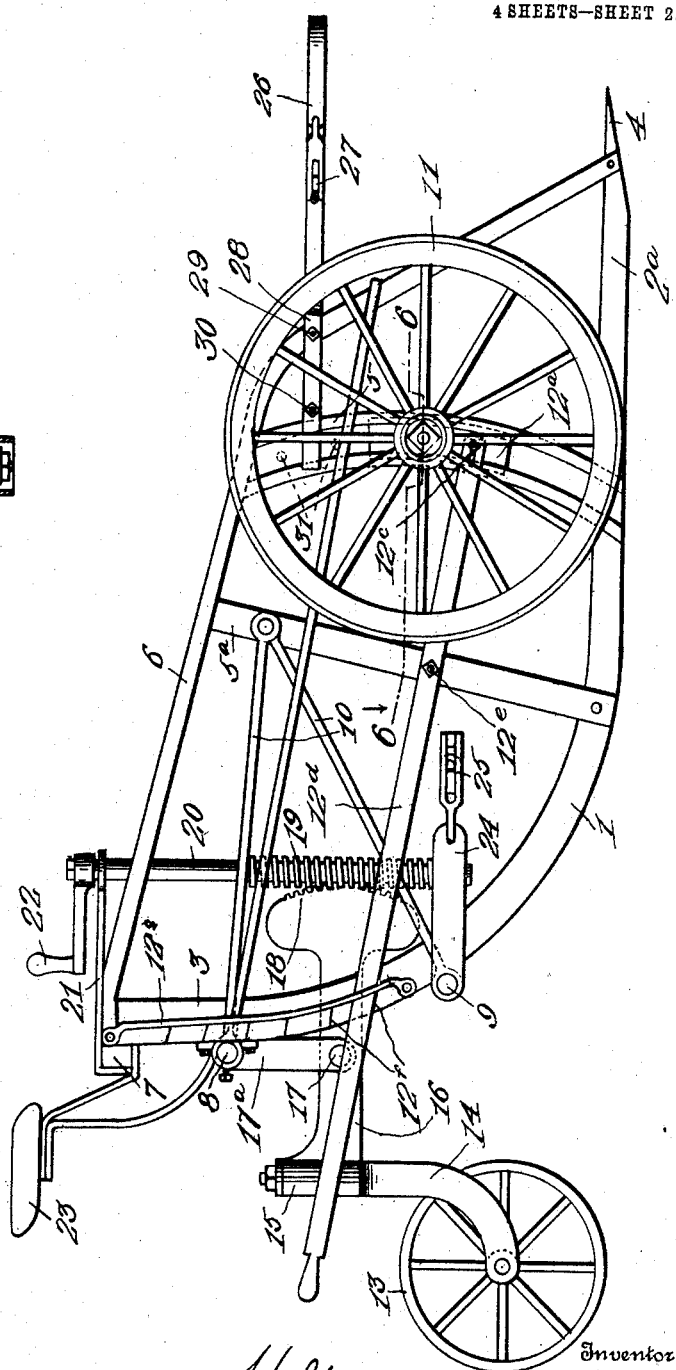

UNITED STATES PATENT OFFICE.

HALFDAN CHRISTIANSON, OF UPHAM, NORTH DAKOTA.

SHOCK-CARRIER.

No. 927,114.   Specification of Letters Patent.   Patented July 6, 1909.

Application filed February 6, 1909. Serial No. 476,542.

*To all whom it may concern:*

Be it known that I, HALFDAN CHRISTIANSON, a citizen of the United States, residing at Upham, in the county of McHenry and State of North Dakota, have invented certain new and useful Improvements in Shock-Carriers, of which the following is a specification, reference being had to the accompanying drawings.

This invention relates to improvements in raking devices for picking up and carrying shocks.

The object of the invention is to improve and simplify the construction and operation of implements of this character and thereby render the same less expensive and more durable and efficient.

With the above and other objects in view, the invention consists of the novel features of construction and the combination and arrangement of parts hereinafter fully described and claimed, and illustrated in the accompanying drawings, in which—

Figure 1 is a top plan view of the improved shock carrier or rake; Fig. 2 is a side elevation of the machine; Fig. 3 is a vertical transverse section; Fig. 4 is a vertical longitudinal section; Fig. 5 is a detail view showing the mounting of one of the draft poles or tongues; Fig. 6 is a detail horizontal section taken on the plane indicated by the line 6—6 in Fig. 2; Fig. 7 is a detail perspective of a portion of one of the wheel adjusting levers, its fulcrum support, the axle carrying slide and a portion of the guide for the latter; and Fig. 8 is a detail view showing the rack for one of the levers.

The invention comprises a scoop-like rake 1 mounted on supporting wheels so that it may be drawn or pushed by draft animals and also mounted so that it may be tilted angularly in a forward and rearward direction and also raised and lowered vertically to cause it to effectively engage and lift the shock. The rake body is composed of two side frames and a bottom, the latter consisting of a plurality of parallel tines or teeth 2 which extend in a forward and rearward direction, as shown in Fig. 4, and which have their rear portions curved longitudinally in an upward and rearward direction, as shown at 3, to provide an upright back portion for the rake body. The bottom ends of the tines or teeth have their bottom faces beveled downwardly and rearwardly, as shown at 4, so that they may readily slide over the ground when lowered into contact with the same, and when said teeth are made hollow their front ends are preferably closed, as shown in Fig. 4. While the teeth may be of any suitable form and construction, they are preferably made of channeled metal bars of U-shape in cross section, as shown in Fig. 3, and they have their channeled or hollow faces turned downwardly. The upwardly curved rear ends of the teeth 2 are united by horizontally disposed, longitudinal bars 7, 8, 9 which are suitably secured to them, but it will be understood that they may be otherwise connected together.

Each of the side frames of the rake body is composed of the outer or endmost tooth or tine $2^a$, two vertically extending standards or uprights 5, $5^a$, an upper side bar 6 and one or more inclined or diagonal braces 10. The standards 5, $5^a$ rise from the tooth $2^a$ and have their upper ends suitably fixed to the upper side bar 6, which latter has its rear end secured to one end of the uppermost longitudinal bar 7 and its forward end bent downwardly and secured to the front end of the tooth $2^a$. The inclined or converging braces 10 extend from the standard $5^a$ to the longitudinal bars 8, 9 and thereby greatly strengthen the side frame and also the entire body of the rake.

The rake or carrier is supported by two large side or end wheels 11 journaled on stub shafts 12 projecting from slides $12^a$ vertically adjustable upon the side frames of the rake body. The slides $12^a$ are in the form of substantially rectangular plates, preferably curved longitudinally and arranged for vertical sliding movement in curved or similar-shaped guides formed by making the standards 5 channeled or with undercut guide flanges $12^b$ upon their outer faces to receive said slide plates $12^a$. The latter are loosely connected, as shown at $12^c$, to the forward ends of operating and adjusting levers $12^d$ pivoted intermediate their ends at $12^e$ upon the standards $5^a$, as shown in Fig. 2. The rear ends of the levers $12^d$ are shaped to provide handles and they are adapted to be secured in adjusted positions by engaging them with racks $12^f$ arranged, preferably, upon the upper rear portions of the end or outermost teeth $2^a$. Guard rods $12^g$ are arranged adjacent to the racks or ratchets 12$^f$ to retain the levers 12$^d$ in position. It will be seen that by raising and lowering the rear ends of the levers 12$^d$, the body of the rake may be raised or lowered vertically with respect to the axles of the wheels 11.

The rear portion of the rake body is supported by a caster wheel 13 journaled in a forked hanger 14, the vertical pivot at the upper end of which is rotatable in a bearing 15. The latter is disposed on the rear end of a forwardly and rearwardly extending lever 16 which is fulcrumed intermediate its ends, as shown at 17, on a hanger 17$^a$ secured to and depending from the longitudinal bar 8. The forward end of the lever 16 is formed with a segmental gear 18 which meshes with a worm 19 on a vertical shaft 20 journaled in upper and lower bearings 21, 21$^a$ secured, respectively, to the longitudinal bars 7, 9 and projecting forwardly therefrom. Upon the upper end of the shaft 20 is a crank handle 22 by means of which the shaft may be rotated to rock the lever 16 and thereby raise or lower the rear end of the body to tilt the latter at any angle in a forward and rearward direction. The crank 22 is disposed within reach of the driver or operator who sits upon a seat 23 suitably mounted upon the center of the rear end of the rake body.

To enable the machine to be pushed or drawn by draft animals, a draft bar or beam 24 projects from each side of the rear portion of the rake head and carries a swingletree, doubletree, or other draft connection 25, so that one or more animals may be disposed on either side of the implement. At the front portion of each side of the rake is mounted a draft tongue or pole 26, the front end of which is curved outwardly and carries a neck yoke 27 when the draft device 25 is a doubletree. The rear portion of the tongue 26 is forked, as shown at 28, to straddle the adjacent upper side bar 6 and is pivoted thereto by a horizontal bolt or other pivot 29. This pivot permits the pole 26 to swing vertically and the arms 28 of its forked end receive one of the standards 5 between them and are carried thereby. A bolt 30 connects the arms 28 adjacent their free ends to hold them in spaced relation and prevent them from being sprung out of engagement with the standards. By pivoting the draft poles 26 in this manner and providing stops 31 for limiting their swinging movement, it will be seen that when the rake is raised or lowered or tilted, no unnecessary weight or strain will be placed upon the neck yokes.

Having thus described the invention what is claimed is:

1. An implement of the character described comprising a scoop-like rake, supporting wheels on opposite sides of the same between its front and rear portions and upon which the rake is pivoted, a lever fulcrumed intermediate its ends upon the rear portion of the rake and having a segmental worm gear at one end and a bearing at its other end, a caster wheel, a hanger for the latter rotatable in said bearing, a crank shaft, and a worm upon the crank shaft in mesh with said gear.

2. An implement of the character described comprising a scoop-like rake, supporting wheels on opposite sides of the same between its front and rear portions and upon which the rake is pivoted, connections for draft animals on each side of the implement, a caster wheel at the center of the rear portion of the rake, means for raising and lowering the rear portion of the rake with respect to the caster wheel and a driver's seat at the rear portion of the rake.

3. An implement of the character described comprising a wheel supported rake pivoted for vertical swinging movement, means for supporting and adjusting the rear portion of the rake, draft trees attached to the opposite sides of the rear portion of the rake, vertically swinging neck yoke poles pivoted to the sides of the rake for swinging movement independent of the movement of the rake and means upon the rake for guiding said neck yoke poles in their vertical swinging movement.

4. An implement of the character described comprising a rake consisting of parallel teeth having upwardly curved rear portions, longitudinal bars uniting said curved rear portions of the teeth, side frames for the rake, each consisting of standards rising from the endmost teeth, upper side bars united to the ends of the endmost teeth and the tops of the standards, and braces between certain of said standards and the longitudinal bars, side supporting wheels journaled upon certain of said standards, and means for supporting and adjusting the rear portion of the rake.

5. An implement of the character described comprising a rake consisting of connected teeth and side frames having upright standards and side bars connected to the latter, side supporting wheels journaled on the standards, means for supporting and adjusting the rear portion of the rake, draft trees at the rear portion of the rake, and neck yoke poles having forked rear ends to straddle the bars of the side frames and pivoted to said bars, said forked portions being also adapted to straddle and swing upon the standards.

6. An implement of the character described comprising a scoop-like rake, vertical guides at the opposite sides of the same, slides in said guides and provided with stub axles, supporting wheels journaled on said stub axles, means for adjusting said slides in their guides and means for supporting the rear portion of the rake.

7. An implement of the character described comprising a scoop-like rake, vertical guides at the opposite sides of the same, slides in said guides and provided with stub axles, supporting wheels journaled on said stub axles, levers fulcrumed intermediate their ends to the rake and having their forward ends loosely connected to said slides, means for securing the rear ends of said levers in adjusted position and means for supporting the rear portion of the rake.

In testimony whereof I hereunto affix my signature in the presence of two witnesses.

HALFDAN CHRISTIANSON.

Witnesses:
CHAS. E. FOUTS,
JACOB NELSON.